Jan. 16, 1934.                E. S. J. HOLLAND                1,944,083
                    AUXILIARY ELECTRIC SUPPLY SYSTEM
                          Filed March 22, 1933

Inventor:
Edward S. J. Holland,
by Charles E. Tullar
His Attorney.

Patented Jan. 16, 1934

1,944,083

UNITED STATES PATENT OFFICE 1,944,083

AUXILIARY ELECTRIC SUPPLY SYSTEM

Edward S. J. Holland, Framingham Center, Mass., assignor to Warren Telechron Company, Ashland, Mass., a corporation of Maine Application March 22, 1933. Serial No. 662,092

8 Claims. (Cl. 171—97)

My invention relates to an auxiliary electric supply system and control apparatus therefor as used to supplement an alternating current supply system when the latter fails. My invention is particularly suitable for use with clock systems operated from an ordinary alternating current system. Occasionally alternating current systems fail for one reason or another, and in such cases it is often desirable, particularly in large office buildings, to have a reserve source of supply which will always be in readiness and come into operation automatically to deliver alternating current at the correct frequency and voltage to maintain the clock system in operation during the time the normal source is interrupted. My invention provides a reliable and economical system and control apparatus for this general purpose.

In carrying my invention into effect, I provide a storage battery, apparatus for charging the battery from the existing alternating current system following an interruption, apparatus supplied from the storage battery during an interruption for delivering energy at the proper voltage and frequency to the apparatus such as electric clocks normally supplied from the alternating current source, and suitable control apparatus for automatically effecting the necessary changes in the electrical connections when the normal alternating current supply fails and comes on again, and for controlling the recharging of the storage battery in accordance with requirements. The latter control apparatus includes timing means for measuring the duration of an interruption and for prolonging the charging of the battery following an interruption a proportionate length of time. Other features of the invention will be pointed out in the detail description which follows.

The features of the invention which are considered to be novel and patentable will be pointed out in the claims appended hereto. For a better understanding of the invention, reference is made in the following description to the accompanying drawing, Fig. 1 of which represents a general plan of the apparatus and the connections thereof as associated with a clock system normally supplied from an alternating current source, and Fig. 2 is a detail view of a preferred form of timing relay motor mechanism for controlling the charging of the storage battery.

Figure 1:
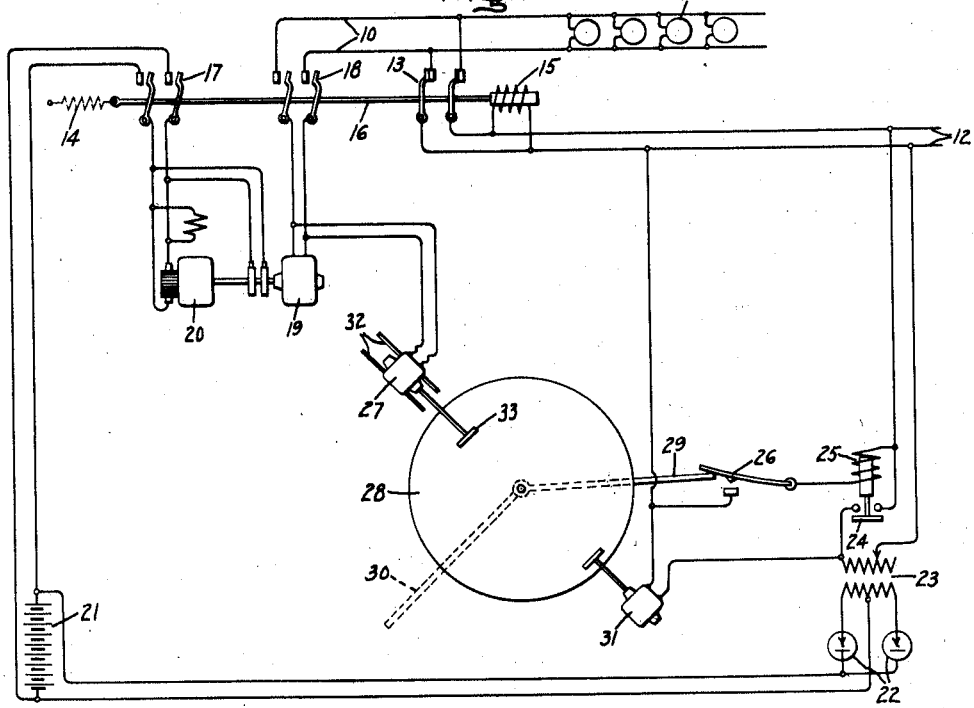
Figure 2:
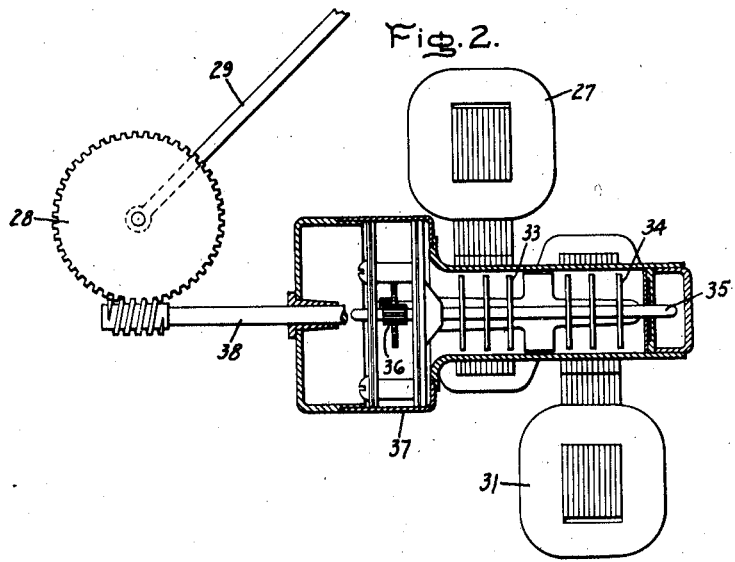

Referring now to Fig. 1, 10 represents a load circuit which may include a number of synchronous motor driven electric clocks, indicated by 11. This load circuit is normally supplied from an alternating current source, indicated at 12, through a double pole switch 13 held in the closed position shown against the tension of a spring 14 or its equivalent by a relay 15 energized from source 12. It will be evident that when source 12 fails, relay 15 will become ineffective and spring 14 will open switch 13.

Attached to switch bar 16 are two additional switches 17 and 18, which close as switch 13 opens, and vice versa. The switches 17 and 18 when closed connect up any suitable auxiliary apparatus for supplying the load lines 10 with normal voltage and frequency during the interruption of source 12. In this instance switch 18 connects an alternating current generator 19 to the load lines 10, and switch 17 connects a direct current motor 20 to a storage battery 21, at the same time energizing the direct current field winding of the synchronous generator 19. Motor 20 drives generator 19 and the conditions are made such that when the motor generator set is in operation and delivering its normal load the voltage and frequency supplied to load lines 10 is the same as that normally supplied from source 12. It will be understood that in place of a motor generator set, I may provide any other suitable apparatus for converting direct current into alternating current at the proper voltage and frequency, I may for example use a rotary converter controlled in the manner described in the United States Patent to Warren No. 1,420,896, June 27, 1922, assigned to the same assignee as the present invention.

In order to recharge battery 21 after an operation requiring the use of the auxiliary source of supply, I provide battery charging rectifying apparatus indicated at 22 supplied through a transformer 23 and a switch 24 from the source 12. The charging switch 24 is controlled by a relay 25 and the circuit of the relay is controlled by a time controlled contact 26. The arrangement is such that the period of operation of the motor generator set, which is the same as the duration of an interruption, is measured, and following the interruption the battery charging apparatus is kept in operation a proportionate length of time. The apparatus for measuring the duration of an interruption of source 12 comprises a self-starting synchronous motor 27 supplied from synchronous generator 19. Motor 27 drives a disc 28 in a clockwise direction through suitable reduction a distance proportional to the time that generator 19 is in operation. Attached to the shaft of disc 28 is an arm 29 which in the position shown holds contactor 26 open, but as soon as motor 27 starts to operate allows contactor 26 to close. Arm 29 is thereafter driven slowly in a clockwise direction so long as generator 19 operates, and comes to rest, let us say, in the dotted line position 30, when source 12 is restored and generator 19 stops after a longer than usual interruption. When contactor 26 first closes nothing happens, because source 12, from which relay 25 is energized, is dead. Consequently, switch 24 is not closed until source 12 is restored and arm 29 comes to rest at 30 or some other position, depending upon the duration of the interruption. When source 12 is restored, relay 25 is energized therefrom and switch 24 is closed, energizing the battery charging apparatus 22, and the battery recharging operation is started.

The closing of switch 24 completes the circuit of a second self-starting synchronous motor 31 energized from source 12 through switch 24. Synchronous motor 31 measures the battery charging time and drives the disc 28 in a counter-clockwise direction, so that after a battery charging period proportional to the previous period of interruption of source 12 and operation of the auxiliary apparatus from the battery, arm 29 is again rotated to the full line position to open contactor 26. This opens the circuit of relay 25, switch 24 opens, the battery charging is discontinued, and motor 31 stops, leaving the apparatus in the condition shown in the drawing. If the battery charging apparatus 22 is suitable for charging the battery at the same average rate that the battery discharges, the discharging period may be made the same as the charging period, in which case the speeds of motors 27 and 31 and their drive ratios to disc 28 may be made the same.

If the charging rate is slower than the discharging rate, motor 27 should drive arm 29 in a clockwise direction at a proportionately faster rate than motor 31 returns it in a counter-clockwise direction. In the drawing, I have represented motor 27 as adjustable on radial guides 32 in order that the friction wheel 33 on its shaft may be moved toward and away from the center of disc 28 in order to vary the drive ratio to adjust for any difference between the discharging and charging rates of the battery. This provides means for varying the relative timing periods of the two timing means in the control of the charging switch.

It is presumed the apparatus will be inspected occasionally, and if when inspected it is found that the battery needs to be charged, arm 29 may be manually moved in a clockwise direction a suitable amount to provide an extra charging operation independently of any interruption in the normal source, and motor 27 may be adjusted more toward the center of disc 28 so that after the manually controlled recharging operation subsequent automatic control will keep the battery charged. Similar adjustments may be made in case the average load on line 10 increases. Most interruptions are of short duration, and interruptions of two hours' duration are extremely rare. It is, therefore, generally sufficient to arrange the apparatus for maximum interruptions of two hours' duration, such that arm 29 slowly moves in a clockwise direction not faster than one revolution in two hours.

I will now review briefly the operation of the apparatus as a whole, starting with the apparatus in the condition shown and on the presumption that source 12 is alive and that the battery is fully charged. Under these conditions all the auxiliary apparatus is idle and no relay coils or auxiliary motors are energized, with the exception of relay 15. An interruption of source 12 now occurs, switch 13 opens and switches 17 and 18 close, the motor generator set starts into operation and supplies normal energy to lines 10 at normal voltage and frequency. This change over is completed in a few seconds, so that there is no noticeable error introduced in the time as given by the secondary clocks connected to lines 10. Motor 27 also starts into operation and drives arm 29 in a clockwise direction, leaving contactor 26 closed. Upon source 12 being restored, relays 15 and 25 are energized, switches 17 and 18 open, switch 13 closes and switch 24 closes. Normal energization is thus restored to load lines 10; the motor generator set shuts down; motor 27 stops; battery charging apparatus 22 becomes active to recharge the battery; and motor 31 starts up to return arm 29 in a counter-clockwise direction. After a time, dependent upon the previous period of interruption, contactor 26 is opened, switch 24 is opened, battery charging stops and motor 31 stops, leaving the apparatus in the initial condition.

Fig. 2 represents a reversible self-starting synchronous motor combination that may be used to operate the arm 29 of Fig. 1. 27 and 31 represent similar self-starting synchronous motors having their rotors 33 and 34 on the same shaft 35. The rotors and a gear reduction represented at 36 are inclosed in a non-magnetic housing 37, and a low speed terminal shaft 38 is worm-geared to a shaft upon which arm 29 is secured. The complete details of the gear reduction are not shown but it may be arranged as shown in United States Patent No. 1,495,936, Warren, May 27, 1924, assigned to the same assignee as the present invention. Motors 27 and 31 are arranged to drive in opposite directions when energized.

This arrangement does not permit adjusting the drive rate in opposite directions, but we may adjust the battery charging rate so as to make it equal to or slightly greater than the discharge rate, as, for example, by adjusting the secondary voltage of transformer 23, Fig. 1.

Details of construction may be modified to suit requirements without departing from the invention disclosed, and all modifications that fall within the true spirit and scope of the invention are intended to be covered by the appended claims.

What I claim as new and desire to secure by Letters Patent of the United States is:

1. In combination, an electric load circuit, a normal source of supply for said circuit, auxiliary supply apparatus for supplying said load circuit during a failure of the normal source of supply, relay means responsive to the voltage of the normal source of supply for disconnecting the normal source of supply from said load circuit and connecting said auxiliary supply apparatus thereto when the normal source fails and performing the reverse operation when the normal source of supply is restored, a storage battery for supplying said auxiliary supply apparatus, means for charging said battery from the normal source of supply, means for timing the period during which the auxiliary supply apparatus is active to supply the load circuit, means for timing the period during which said battery charging apparatus is active, and means controlled by said two timing means for controlling the battery charging means so that it is active, following an interruption and restoration of the normal source of supply, for a period of time proportional to the duration of the interruption.

2. In combination, a load circuit, a normal source of supply therefor, auxiliary apparatus including a storage battery for supplying said load circuit during periods of failure of the normal source of supply, relay means responsive to the failure and restoration of the normal source of supply for respectively disconnecting the load circuit therefrom and connecting it to the auxiliary apparatus, and vice versa, means for charging the storage battery from the normal source of supply, a circuit controller between said charging means and normal source of supply, and timing relay means for causing the closing of said circuit controller upon the restoration of the normal source following an interruption, and for causing the opening of said circuit controller again after a period of time proportional to the period of interruption of the normal source.

3. In combination, a load circuit, a normal source of supply therefor, an auxiliary source of supply therefor including a storage battery, circuit connecting means for alternately connecting said load circuit to either source of supply, relay means responsive to the normal source of supply for transferring the load circuit to the auxiliary source when the normal source fails and performing the reverse operation when the normal source is restored, means for charging the battery from the normal source and timing relay control means therefor for energizing the battery charging means following an interruption and restoration of the normal source of supply and thereafter maintaining the battery charging means in operation for a period of time proportional to the length of the previous interruption in the normal source.

4. In combination, an alternating current load circuit, a normal source of alternating current supply therefor, an auxiliary source of alternating current supply therefor, including a storage battery and means supplied therefrom for converting direct current into alternating current of substantially the same voltage and frequency as that of the normal source, switches between the battery and converting means, between the converting means and load circuit, and between the load circuit and normal source of supply, relay means responsive to the normal source of supply for opening the last mentioned switch and closing the first two mentioned switches when the normal source fails and performing the reverse operations when the normal source is restored, and means for automatically charging said storage battery from the normal source of supply following an interruption in and restoration of said normal source for a length of time proportional to the period of such interruption.

5. In combination, a load circuit, normal and auxiliary sources of supply therefor, the auxiliary source of supply including a storage battery, means controlled in response to the failure and restoration of the normal source of supply for supplying the load circuit from the auxiliary source during the period of failure of the normal source, means for charging the storage battery from the normal source, a charging switch between the battery charging means and normal source, means for timing the period of failure of the normal source during which the auxiliary source is supplying the load circuit, means for timing the battery charging period, said two timing means serving to control the closing of the charging switch when the normal source is restored following an interruption and thereafter to control the opening of the switch again after a period of time proportional to the duration of such interruption.

6. In combination, a load circuit, normal and auxiliary sources of supply therefor, the auxiliary source of supply including a storage battery, means controlled in response to the failure and restoration of the normal source of supply for supplying the load circuit from the auxiliary source durng the period of failure, means for charging the storage battery from the normal source, a charging switch between the battery charging means and normal source, means for timing the period of failure of the normal source during which the auxiliary source is supplying the load circuit, means for timing the battery charging period, said two timing means serving to control the closing of the charging switch when the normal source is restored following an interruption and thereafter to control the opening of the switch again after a period of time proportional to the duration of such interruption, and means for varying the relative timing periods of said two timing means in the control of said switch.

7. In combination, a load circuit, normal and auxiliary sources of supply therefor, the auxiliary source of supply including a storage battery, means controlled in response to the failure and restoration of the normal source of supply for supplying the load circuit from the auxiliary source during the period of failure, means for charging the storage battery from the normal source, a charging switch between the battery charging means and normal source, means for timing the period of failure of the normal source during which the auxiliary source is supplying the load circuit, means for timing the battery charging period, said two timing means serving to control the closing of the charging switch when the normal source is restored following an interruption and thereafter to control the opening of the switch again after a period of time proportional to the duration of such interruption, and means for manually adjusting the control means of the charging switch so as to charge the battery for an adjustable period of time independently of any interruption in the normal source.

8. In combination, a load circuit, normal and auxiliary sources of alternating current supply therefor, the auxiliary source including a storage battery and apparatus supplied therefrom for converting direct current to alternating current, means controlled in response to an interruption and restoration of the normal source for supplying the load circuit from the auxiliary source during such interruption, charging means for the battery supplied from the normal source, a switch for controlling said charging means, a rotary arm for opening and closing said switch, a self-starting synchronous motor supplied from the auxiliary source when operating to supply the load circuit for slowly moving said arm in a direction to allow the switch to close, and a self-starting synchronous motor supplied from the normal source only when the switch is closed for slowly moving said arm in the opposite direction to open said switch.

EDWARD S. J. HOLLAND.